(12) United States Patent
Hill

(10) Patent No.: US 11,659,817 B2
(45) Date of Patent: May 30, 2023

(54) SMART PET COLLAR APPARATUS

(71) Applicant: Christopher Hill, Clinton, NC (US)

(72) Inventor: Christopher Hill, Clinton, NC (US)

( * ) Notice: Subject to any disclaimer, the term of this patent is extended or adjusted under 35 U.S.C. 154(b) by 79 days.

(21) Appl. No.: 17/476,550

(22) Filed: Sep. 16, 2021

(65) Prior Publication Data

US 2023/0080950 A1     Mar. 16, 2023

(51) Int. Cl.
*A01K 27/00* (2006.01)
*A01K 15/02* (2006.01)

(52) U.S. Cl.
CPC ............ *A01K 27/009* (2013.01); *A01K 15/021* (2013.01); *A01K 27/001* (2013.01); *A01K 27/006* (2013.01); *A01K 27/008* (2013.01)

(58) Field of Classification Search
CPC ... A01K 27/001; A01K 27/006; A01K 27/008; A01K 27/009; A01K 15/021; A01K 15/022; A01K 15/023; G06K 19/07762; G08B 21/22; A61B 5/7435; G04B 37/1486; G04B 37/148; A61B 5/7475; A61B 5/6833; A44B 11/2596; G06F 1/163; A61B 5/0006; G04B 37/1413; A44C 5/2085; G04G 17/04; A61B 5/274; A61B 5/0205; A44C 5/147; A61B 5/002; G04G 17/08; A61B 5/14532; A61B 2562/0209; A61B 2562/0257
See application file for complete search history.

(56) References Cited

U.S. PATENT DOCUMENTS

| | | | |
|---|---|---|---|
| 5,749,324 A | 5/1998 | Moore | |
| D409,803 S | 5/1999 | Yoka | |
| 7,411,492 B2 | 8/2008 | Greenberg | |
| 7,864,057 B2 | 1/2011 | Milnes et al. | |
| 8,115,642 B2 | 2/2012 | Thompson et al. | |
| 8,543,134 B2 | 9/2013 | Lopez et al. | |
| 2007/0204804 A1 | 9/2007 | Swanson et al. | |
| 2011/0193706 A1 | 8/2011 | Dickerson | |
| 2013/0157628 A1 | 6/2013 | Kim et al. | |

*Primary Examiner* — Joshua J Michener
*Assistant Examiner* — Henry Hooper Mudd

(57) ABSTRACT

A smart pet collar apparatus for pet training and safety includes a collar having a plurality of adjustment apertures extending from the collar. A buckle frame has a buckle cavity, a first buckle bar, and a second buckle bar. A prong is coupled to the second buckle bar and is selectively engageable with the plurality of adjustment apertures. A battery is coupled within the buckle cavity. A charge port, a microprocessor, a GPS tracker, a transceiver, and a plurality of control buttons are coupled to the buckle frame. The charge port is in operational communication with the battery. The GPS chip and the transceiver are in operational communication with the battery and the microprocessor. The transceiver is configured to interact with a smartphone.

11 Claims, 4 Drawing Sheets

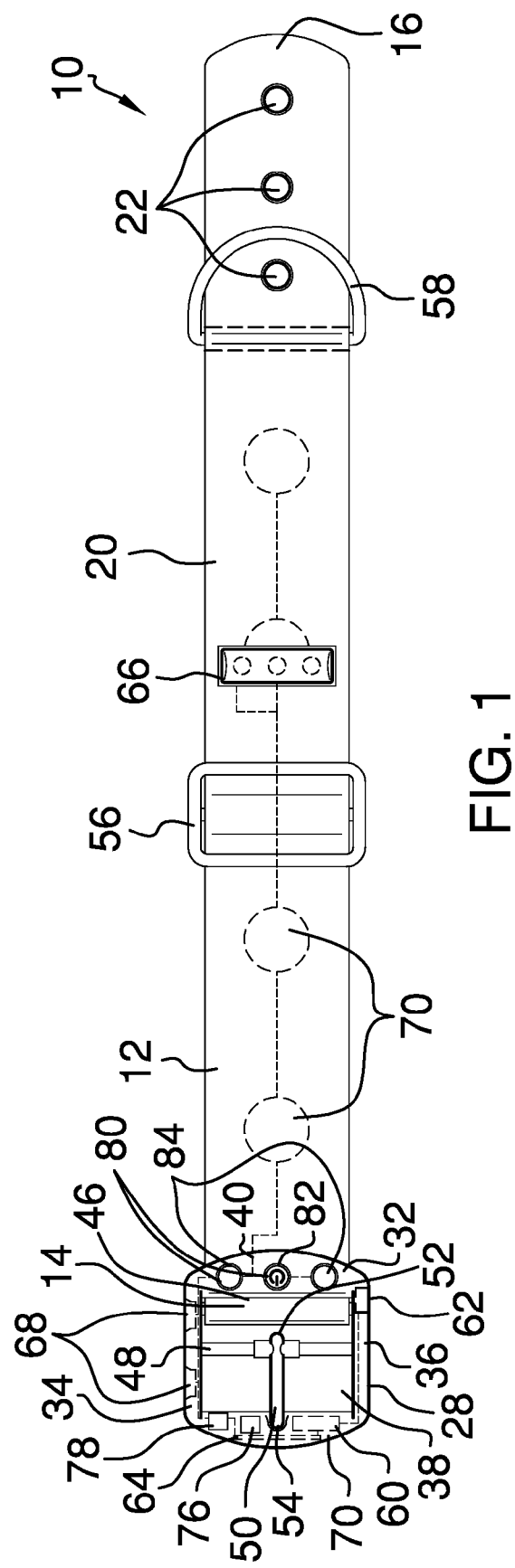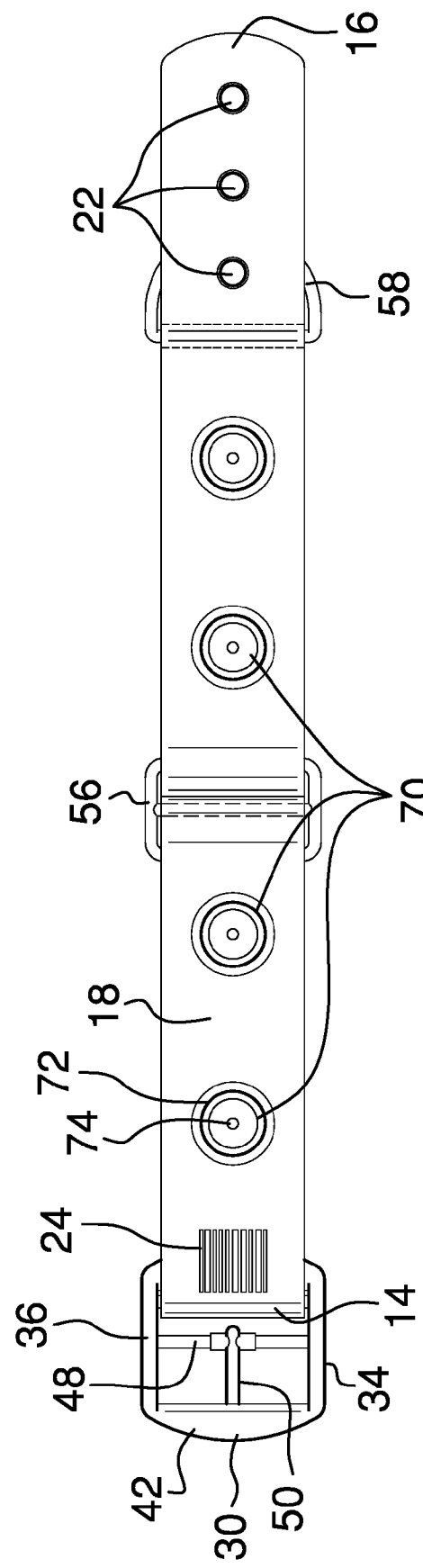

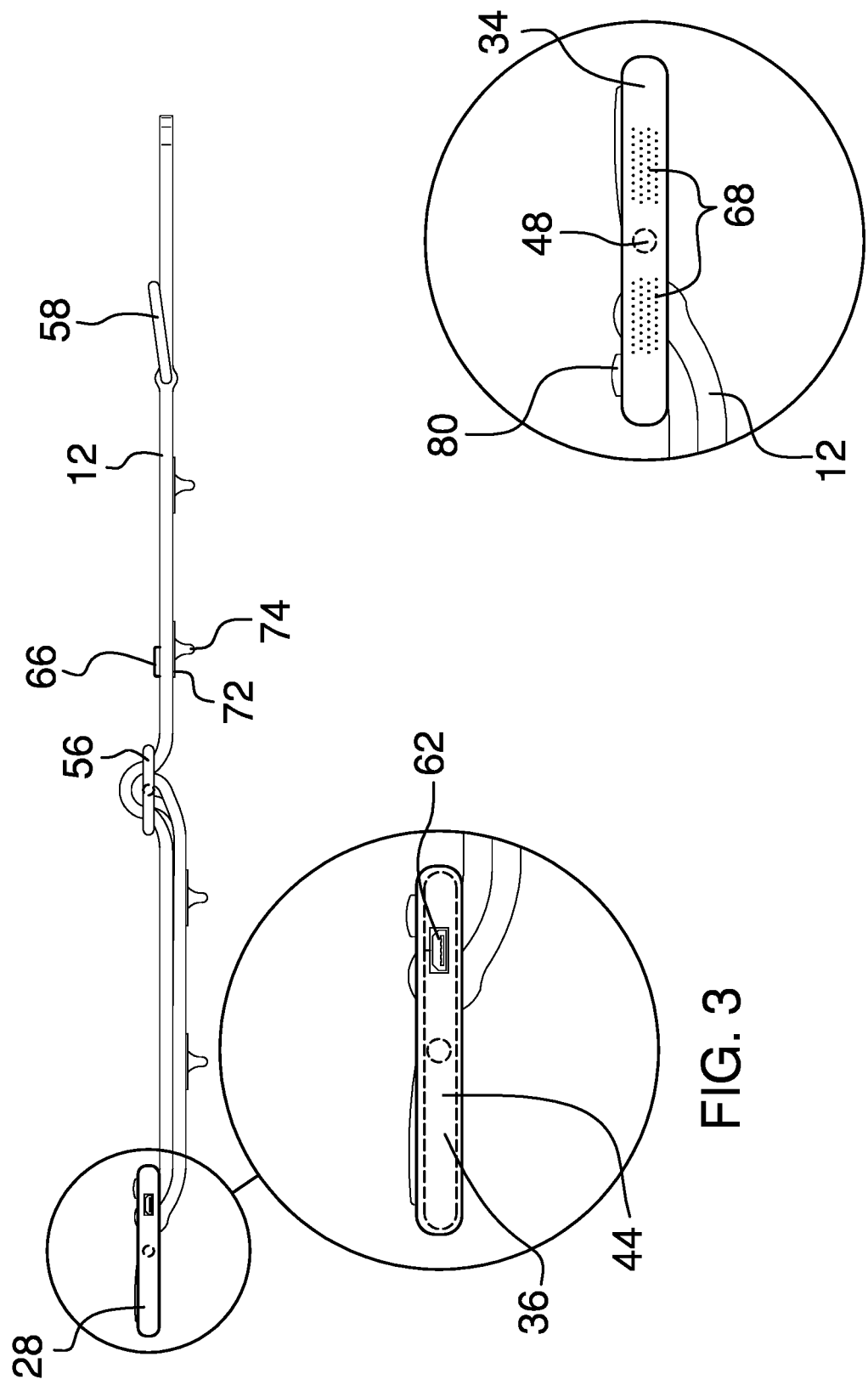

SMART PET COLLAR APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

Field of the Invention

Description of Related Art Including Information Disclosed Under 37 CFR 1.97 and 1.98

The disclosure and prior art relates to pet collars and more particularly pertains to a new pet collar for pet training and safety.

BRIEF SUMMARY OF THE INVENTION

An embodiment of the disclosure meets the needs presented above by generally comprising a collar having a buckle end, a distal end, an inner collar side, and an outer collar side. The collar has a plurality of adjustment apertures extending from the outer collar side through the inner collar side proximal the distal end. A buckle frame has a left portion, a right portion, a top portion, and a bottom portion defining a buckle aperture. The buckle frame has a buckle outer side and a buckle inner side defining a buckle cavity within the left portion, the right portion, the top portion, and the bottom portion. A first buckle bar is coupled to the buckle frame and extends from the bottom portion to the top portion. The buckle end of the collar is coupled around the first buckle bar. A second buckle bar is coupled to the buckle frame and extends from the bottom portion to the top portion between the first buckle bar and the left portion of the buckle frame. A prong is coupled to the second buckle bar. The prong has a near end pivotably coupled to the second buckle bar and a far end selectively contacting the left portion of the buckle frame. The prong is selectively engageable with the plurality of adjustment apertures. A battery is coupled to the buckle frame within the buckle cavity. A charge port is coupled to the buckle frame and is in operational communication with the battery. A microprocessor is coupled to the buckle frame within the buckle cavity and is in operational communication with the battery. A GPS chip is coupled to the buckle frame within the buckle cavity and is in operational communication with the battery and the microprocessor. A transceiver is coupled to the buckle frame within the buckle cavity and is in operational communication with the battery and the microprocessor. The transceiver is configured to interact with a smartphone. A plurality of control buttons is coupled to the buckle frame and is in operational communication with the battery and the microprocessor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWINGS

The disclosure will be better understood and objects other than those set forth above will become apparent when consideration is given to the following detailed description thereof. Such description makes reference to the annexed drawings wherein:

FIG. 1 is a front elevation view of a smart pet collar apparatus according to an embodiment of the disclosure.

FIG. 2 is a rear elevation view of an embodiment of the disclosure.

FIG. 3 is a bottom plan view of an embodiment of the disclosure.

FIG. 4 is a detail view of an embodiment of the disclosure.

DETAILED DESCRIPTION OF THE INVENTION

Figure 5:
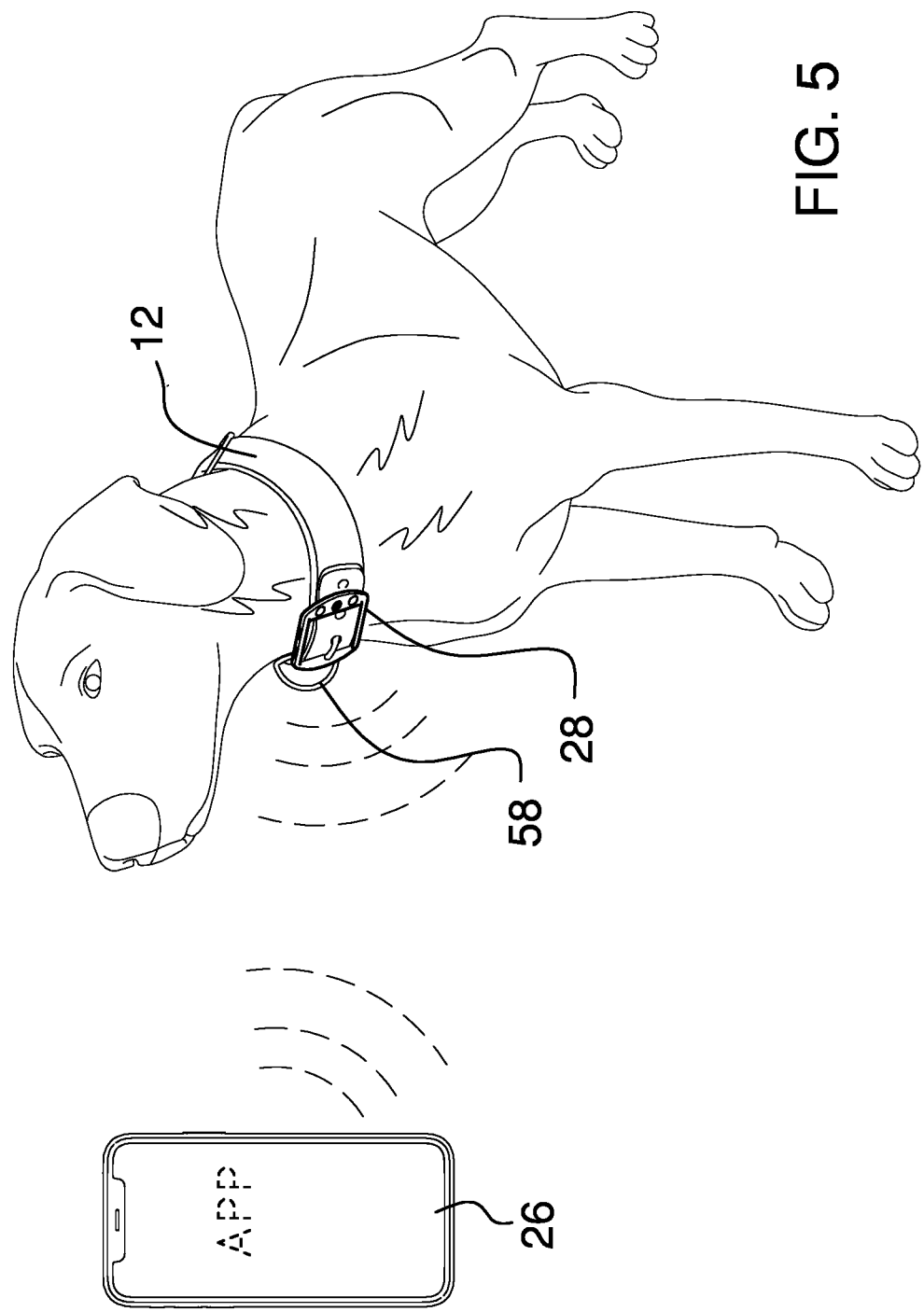
FIG. 5 is an in-use view of an embodiment of the disclosure.
Figure 6:
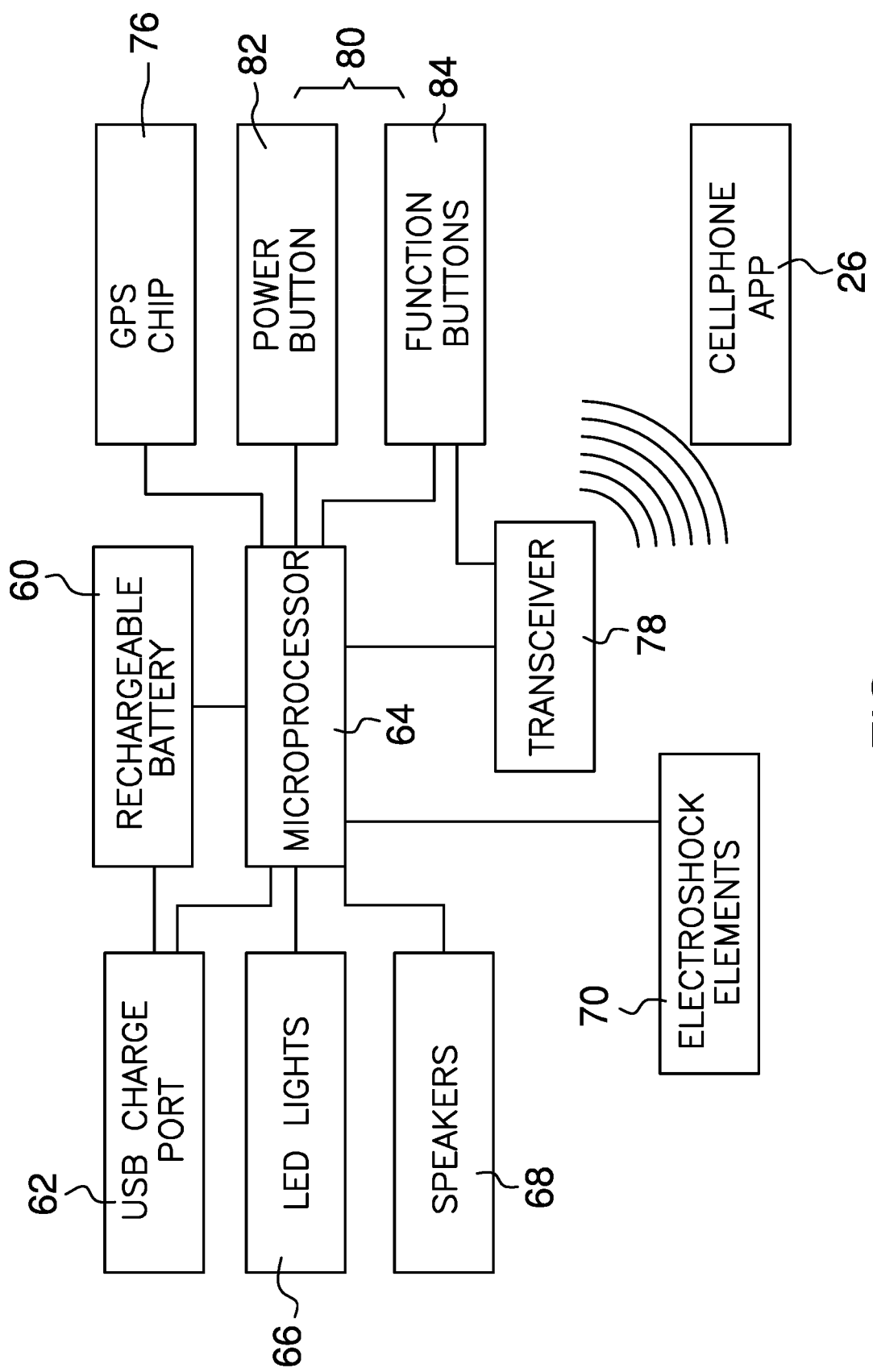
FIG. 6 is a block diagram view of an embodiment of the disclosure.

With reference now to the drawings, and in particular to FIGS. 1 through 6 thereof, a new pet collar embodying the principles and concepts of an embodiment of the disclosure and generally designated by the reference numeral 10 will be described.

As best illustrated in FIGS. 1 through 6, the smart pet collar apparatus 10 generally comprises a collar 12 having a buckle end 14, a distal end 16, an inner collar side 18, and an outer collar side 20. The collar 12 has a plurality of adjustment apertures 22 extending from the outer collar side 20 through the inner collar side 18 proximal the distal end 16. A barcode 24 is coupled to the inner collar side 18 and is configured to be read by a smartphone 26 to look up information about the pet and the owner in case the pet is lost. A buckle frame 28 has a left portion 30, a right portion 32, a top portion 34, and a bottom portion 36 defining a buckle aperture 38. The buckle frame 28 has a buckle outer side 40 and a buckle inner side 42 defining a buckle cavity 44 within the left portion 30, the right portion 32, the top portion 34, and the bottom portion 36. A first buckle bar 46 is coupled to the buckle frame 28 and extends from the bottom portion 36 to the top portion 34. The buckle end 14 of the collar 12 is coupled around the first buckle bar 46. A second buckle bar 48 is coupled to the buckle frame 28 and extends from the bottom portion 36 to the top portion 34 between the first buckle bar 46 and the left portion 30 of the buckle frame 28. A prong 50 is coupled to the second buckle bar 48. The prong 50 has a near end 52 pivotably coupled to the second buckle bar 48 and a far end 54 selectively contacting the left portion 30 of the buckle frame 28. The prong 50 is selectively engageable with the plurality of adjustment apertures 22. An adjustment ring 56 is coupled to the collar 12. The collar 12 passes through the adjustment ring 56 and is looped around the first buckle bar 46 and fixed to the adjustment ring 56 to allow the apparatus 10 to fit a range of different pet sizes. An attachment ring 58 is coupled to the collar 12 and is configured to be coupled to a leash.

A battery 60 is coupled to the buckle frame 28 within the buckle cavity 44. A charge port 62 is coupled to the buckle frame 28 and is in operational communication with the battery 60. The charge port 62 may accommodate a micro USB connection. A microprocessor 64 is coupled to the buckle frame 28 within the buckle cavity 44 and is in operational communication with the battery 60. A light bar 66 is coupled to the collar 12. The lightbar 66 may be rectangular and is coupled to the outer collar side 20 and is in operational communication with the battery 60 and the microprocessor 64 to help find a pet in the dark. A pair of speakers 68 is coupled to the buckle frame 28. The pair of speakers 68 is coupled to the top portion 34 and is in operational communication with the battery 60 and the microprocessor 64 to play an alarm when activated. A plurality of electric shock elements 70 is coupled to the collar 12. Each of the electric shock elements 70 has a circular base portion 72 coupled to the inner collar side 18 and a medial nipple portion 74 extending from the base portion 72. The plurality of electric shock elements 70 is in operational communication with the battery 60 and the microprocessor 64. Each of the plurality of shock elements 70 is configured to deliver a small electric shock to the pet when activated for training purposes. A GPS chip 76 is coupled to the buckle frame 28 within the buckle cavity 44 and is in operational communication with the battery 60 and the microprocessor 64. A transceiver 78 is coupled to the buckle frame 28 within the buckle cavity 44 and is in operational communication with the battery 60 and the microprocessor 64. The transceiver 78 is configured to interact with a smartphone 26 to allow control of the shock elements 70, the pair of speakers 68, and the lightbar 66, as well as to check the GPS chip 76 location. A plurality of control buttons 80 is coupled to the buckle frame 28. The plurality of control buttons 80 is coupled to the buckle outer side 40 of the right portion 32 and comprises a central power button 82 and a pair of function buttons 84. The plurality of control buttons 80 is in operational communication with the battery 60 and the microprocessor 64 to pair the smartphone 26.

In use, the collar 12 is placed on a pet. The smartphone 26 interacts with the transceiver 78 to determine location with the GPS chip 76, operate the plurality of shock elements 70, and utilize the light bar 66 and the pair of speakers 68 to better monitor and control the pet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart pet collar apparatus comprising:
   a collar, the collar having a buckle end, a distal end, an inner collar side, and an outer collar side, the collar having a plurality of adjustment apertures extending from the outer collar side through the inner collar side proximal the distal end;
   a buckle frame, the buckle frame having a left portion, a right portion, a top portion, and a bottom portion defining a buckle aperture, the buckle frame having a buckle outer side and a buckle inner side defining a buckle cavity within the left portion, the right portion, the top portion, and the bottom portion;
   a first buckle bar coupled to the buckle frame, the first buckle bar extending from the bottom portion to the top portion, the buckle end of the collar being coupled around the first buckle bar;
   a second buckle bar coupled to the buckle frame, the second buckle bar extending from the bottom portion to the top portion between the first buckle bar and the left portion of the buckle frame;
   a prong coupled to the second buckle bar, the prong having a near end pivotably coupled to the second buckle bar and a far end selectively contacting the left portion of the buckle frame, the prong being selectively engageable with the plurality of adjustment apertures;
   a battery coupled to the buckle frame, the battery being coupled within the buckle cavity;
   a charge port coupled to the buckle frame, the charge port being in operational communication with the battery;
   a microprocessor coupled to the buckle frame, the microprocessor being coupled within the buckle cavity and being in operational communication with the battery;
   a GPS chip coupled to the buckle frame, the GPS chip being coupled within the buckle cavity and being in operational communication with the battery and the microprocessor;
   a transceiver coupled to the buckle frame, the transceiver being coupled within the buckle cavity and being in operational communication with the battery and the microprocessor, the transceiver being configured to interact with a smartphone; and
   a plurality of control buttons coupled to the buckle frame, the plurality of control buttons being in operational communication with the battery and the microprocessor.

2. The smart pet collar apparatus of claim 1 further comprising a barcode coupled to the collar, the barcode being coupled to the inner collar side and being configured to be read by a smartphone to look up information about the pet and the owner.

3. The smart pet collar apparatus of claim 1 further comprising the plurality of control buttons being coupled to the buckle outer side of the right portion and comprising a central power button and a pair of function buttons.

4. The smart pet collar apparatus of claim 1 further comprising a light bar coupled to the collar, the lightbar being coupled to the outer collar side and being in operational communication with the battery and the microprocessor.

5. The smart pet collar apparatus of claim 4 further comprising the lightbar being rectangular.

6. The smart pet collar apparatus of claim 1 further comprising a pair of speakers coupled to the buckle frame, the pair of speakers being coupled to the top portion and being in operational communication with the battery and the microprocessor.

7. The smart pet collar apparatus of claim 1 further comprising a plurality of electric shock elements coupled to the collar, the plurality of electric shock elements being coupled to the inner collar side and being in operational communication with the battery and the microprocessor, each of the plurality of shock elements being configured to deliver a small electric shock to the pet when activated.

8. The smart pet collar apparatus of claim 7 further comprising each of the electric shock elements having a circular base portion coupled to the inner collar side and a medial nipple portion extending from the base portion.

9. The smart pet collar apparatus of claim 1 further comprising an adjustment ring coupled to the collar, the collar passing through the adjustment ring, being looped around the first buckle bar, and being fixed to the adjustment ring.

10. The smart pet collar apparatus of claim 1 further comprising an attachment ring coupled to the collar, the attachment ring being configured to be coupled to a leash.

11. A smart pet collar apparatus comprising:
- a collar, the collar having a buckle end, a distal end, an inner collar side, and an outer collar side, the collar having a plurality of adjustment apertures extending from the outer collar side through the inner collar side proximal the distal end;
- a barcode coupled to the collar, the barcode being coupled to the inner collar side and being configured to be read by a smartphone to look up information about the pet and the owner;
- a buckle frame, the buckle frame having a left portion, a right portion, a top portion, and a bottom portion defining a buckle aperture, the buckle frame having a buckle outer side and a buckle inner side defining a buckle cavity within the left portion, the right portion, the top portion, and the bottom portion;
- a first buckle bar coupled to the buckle frame, the first buckle bar extending from the bottom portion to the top portion, the buckle end of the collar being coupled around the first buckle bar;
- a second buckle bar coupled to the buckle frame, the second buckle bar extending from the bottom portion to the top portion between the first buckle bar and the left portion of the buckle frame;
- a prong coupled to the second buckle bar, the prong having a near end pivotably coupled to the second buckle bar and a far end selectively contacting the left portion of the buckle frame, the prong being selectively engageable with the plurality of adjustment apertures;
- an adjustment ring coupled to the collar, the collar passing through the adjustment ring, being looped around the first buckle bar, and being fixed to the adjustment ring;
- an attachment ring coupled to the collar, the attachment ring being configured to be coupled to a leash;
- a battery coupled to the buckle frame, the battery being coupled within the buckle cavity;
- a charge port coupled to the buckle frame, the charge port being in operational communication with the battery;
- a microprocessor coupled to the buckle frame, the microprocessor being coupled within the buckle cavity and being in operational communication with the battery;
- a light bar coupled to the collar, the lightbar being rectangular and being coupled to the outer collar side and being in operational communication with the battery and the microprocessor;
- a pair of speakers coupled to the buckle frame, the pair of speakers being coupled to the top portion and being in operational communication with the battery and the microprocessor;
- a plurality of electric shock elements coupled to the collar, each of the electric shock elements having a circular base portion coupled to the inner collar side and a medial nipple portion extending from the base portion, the plurality of electric shock elements being in operational communication with the battery and the microprocessor, each of the plurality of shock elements being configured to deliver a small electric shock to the pet when activated;
- a GPS chip coupled to the buckle frame, the GPS chip being coupled within the buckle cavity and being in operational communication with the battery and the microprocessor;
- a transceiver coupled to the buckle frame, the transceiver being coupled within the buckle cavity and being in operational communication with the battery and the microprocessor, the transceiver being configured to interact with a smartphone; and
- a plurality of control buttons coupled to the buckle frame, the plurality of control buttons being coupled to the buckle outer side of the right portion and comprising a central power button and a pair of function buttons, the plurality of control buttons being in operational communication with the battery and the microprocessor.

* * * * *